3,225,646
PHOTO-CONDUCTIVE EXPOSURE METER
Torao Nagai, Kitatama-gun, Tokyo, Japan, assignor to Tokyo Kogaku Kikai Kabushiki Kaisha, Tokyo, Japan, a corporation of Japan
Filed July 3, 1962, Ser. No. 207,260
Claims priority, application Japan, July 7, 1961, 36/24,498
1 Claim. (Cl. 88—23)

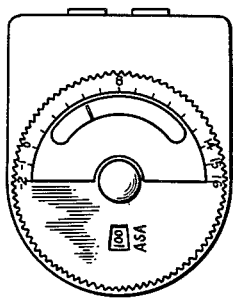

This invention relates to an apparatus for measuring the intensity of illumination by artificial or sunlight by utilizing photo-conductive material, and more particularly to an apparatus for measuring the intensity of illumination comprising a scale having equal intervals between markings and which is useful, especially for photographing as well as many other purposes.

It is an object of the present invention to provide an apparatus for measuring intensity of illumination which apparatus has a photo-conductor circuit which is capable of supplying electric current which is substantially proportional to the logarithmic values of luminous intensity of the light to be measured.

It is another object of the present invention to provide an apparatus which is capable of measuring intensity of illumination over a wide range such as, for instance, the logarithmic values of luminous intensity ranging from 1 lux to 10,000 lux in a single range of scale gradations without changing the measuring range of the apparatus.

The said objects and other objects, as well as advantages of the present invention, will become more apparent by reference to the following description taken in conjunction with the accompanying drawings, in which like members and parts are designated by like reference characters, and in which:

FIG. 1 is an exterior plan view showing one embodiment of the exposure meter according to the present invention;

FIGS. 2 and 3 are circuit diagrams of conventional exposure meters using a photo-conductor;

FIG. 4 is a circuit diagram of the exposure meter according to the present invention;

FIG. 5 is a graph showing characteristic curves of the exposure meters having the circuits as indicated in FIGS. 2, 3, and 4; and FIG. 6 is a graph showing the characteristics of resistances corresponding to exposure values of photo-conductors.

Exposure meters using a photo-conductor, such as cadmium sulphide (hereinafter to be termed $CdS$), heretofore in use have, in general, consisted of a series connected circuit with ammeter 1, dry cell 2, $CdS$ $R_1$ and a compensation resistor $R_5$, as in FIG. 2, or with another resistor $R_4$ connected in parallel to the $CdS$ as in FIG. 3.

Assuming that, in the circuit in FIG. 2, the internal resistance of ammeter 1 and resistance $R_5$ are close to zero in value, and that the resistance of $CdS$ $R_1$ (hereinafter to be denoted by the symbol of photo-conductor itself) has a value noted in the Table 1 "Resistance Values" as set forth hereinafter, the value of current I flowing in the said circuit is equal to the ratio of the electro-motive force E, of the dry cell to the resistance $R_1$ of $CdS$. When the percentage values of the said electric current I are plotted on a graph against the exposure values N (American Standard "General-Purpose Photographic Exposure Meter [Photo-electric type]" approved on September 30, 1957; page 7, § 3, 4 and 6; Exposure Value; American Standard Association), a characteristic curve A as shown in FIG. 5 can be drawn. In the above cited literature, the exposure value and the intensity level of illumination of light has the following relationship:

$$2^N = \frac{BS}{K}$$

$$\therefore B = \frac{K}{S} 2^N \simeq 0.1 \times$$

($2^N$) candela/square foot$\simeq 0.1 \times (2^N)$ lux where B is the intensity level of illumination, S is the exposure index of film such as, for instance, 100, and K is a constant such as, for instance, 1.162. Accordingly, the intensity level of illumination B will hereinafter be denoted by the exposure value N. In FIG. 5, the value of the electric current I is set at 100 when the exposure value N is equal to 16. The said characteristic curve $a$ goes sharply upward almost in the form of a straight line within the range of exposure values from $N=16$ to 12. However, the steepness of the curve lessens remarkably within the range of exposure values from $N=12$ to 6 and it becomes nearly horizontal within the range of exposure values from $N=6$ to $-2$. Therefore, when these variations in the electric current I in relation to exposure value N are marked on the dial plate of an exposure meter in accordance with the said characteristic curve $a$, the gradation can be placed at substantially equal scale intervals within the range of exposure values from $N=16$ to $N=12$, but the markings become more crowded within the range of exposure values from $N=12$ to $N=6$ and then the markings almost all fall at one point within the range of exposure values from $N=6$ to $N=-2$.

FIG. 3 is a circuit wherein an additional resistance $R_4$ has been added in parallel to the $CdS$, in order that the extreme curvature of the characteristic curve $a$, in the aforementioned drawing of FIG. 5, is brought closer to the ideal characteristic line $g$ in order to obtain equally spaced scale graduations. In other words, if the values of the resistance $R_4$ and $R_5$ are changed in accordance with the values in Table I: "Resistance Values" set forth below, the above percentage values for current flow in the ammeter 1, in FIG. 3, will form the curves, corresponding to $b$, $c$, $d$ and $e$ of FIG. 5. Curve $d$ in the above case, will be the closest to the ideal line $g$ but even then the range in which the markings can be equally spaced on the ammeter scale will be limited to the range $=4-12$, with the markings outside this range being squeezed together.

In order to bring the characteristic curve $d$ closer to $g$, a method which has been considered heretofore for the purpose of correcting the spacing of the scale markings is by having an unequal flux density work on the moving coil of the ammeter, such as by spacing the moving coil and magnet unequally at certain points in an external magnet type ammeter, or by moving the position of the magnetic pole in relation to the moving coil in an internal magnet type ammeter. However, when such corrective measures have been utilized in the past, the finished product has not been of uniform quality and has required extensive adjustments. Moreover, because the density distribution of magnetic flux to be utilized is not uniform, construction of the meter as well as its adjustment becomes intricate in spite of the fact that the quantity of magnetic flux to be utilized within the ordinary range of utilization declines greatly and the meter sensitivity becomes inferior, whereby the production efficiency is greatly hindered and the cost is higher.

The present invention relates to an apparatus for measuring exposure values and having a circuit including the photo-electric conductor which eliminates the abovementioned defects. The circuit, as shown in FIG. 4, is composed of a a photo-conductor $R_1$ which is chiefly used for the high intensity range of illumination, such as $$\sqrt{BlBh}-Bh$$

(where: $Bl$ designates the low intensity of illumination to be measured and $Bh$ designates the high intensity of illumination to be measured), resistors $R_3$ and $R_4$ which are connected in series and the series connected in parallel with the two poles of the said photo-conductor $R_1$, another photo-conductor $R_2$ which is chiefly used for the low intensity range of illumination such as $Bl-\sqrt{Bl \cdot Bh}$, one of the poles of which is directly connected with one of the poles of the said photo-conductor R1, and a power source 2, an ammeter 1 and a compensation resistor $R_5$ which are all connected in series and connected in the circuit between the other pole 4 of the said photo-conductor $R_2$ and the junction 3 between the said resistors $R_3$ and $R_4$. The resistance $R_5$ is necessary for maintaining the resistance of the circuit from point 3 through the ammeter 1, the battery 2 and photo-conductor $R_2$ at a constant value.

Of the abovementioned resistors, the resistor $R_4$ is indispensable, but the resistors $R_3$ or $R_5$, on some occasions, can be made zero depending on the internal resistance, etc. of the meter.

FIG. 6 shows an example of the resistance-exposure value characteristics of photo-conductors on sale at present in the general market.

| No. of Fig. | Fig. 2 | Fig. 3 | | | | | Fig. 4 |
|---|---|---|---|---|---|---|---|
| Notation of curved line | a | b | c | d | e | | f |
| Resistance: | | | | | | | |
| $R_1(\Omega)$ | $10^6 \sim 2 \times 10^3$ | $10^6 \sim 2 \times 10^3$ | $10^6 \sim 2 \times 10^3$ | $10^6 \sim 2 \times 10^3$ | $10^6 \sim 2 \times 10^3$ | | $1.2 \times 10^7 \sim 2.4 \times 10^3$ |
| $R_2(\Omega)$ | 0 | 0 | 0 | 0 | 0 | | $3 \times 10^5 \sim 1 \times 10$ |
| $R_3(\Omega)$ | 0 | 0 | 0 | 0 | 0 | | $6 \times 10^3$ |
| $R_4(\Omega)$ | ∞ | $2 \times 10^4$ | $1 \times 10^5$ | $5 \times 10^5$ | $1 \times 10^6$ | | $20 \times 10^3$ |
| $R_5(\Omega)$ | 0 | $1 \times 10^3$ | $3 \times 10^3$ | $1 \times 10^4$ | $3 \times 10^4$ | | $4 \times 10^3$ |

Now, suppose that CdS $R_1$ in FIG. 4, which shows the circuit of the present invention is selected so as to have a characteristic approximately on the line $p$ in FIG. 6, and CdS $R_2$ is selected so as to have a characteristic approximately on the line $q$ in FIG. 6, and furthermore, the remaining resistors $R_3$, $R_4$ and $R_5$ have resistance values as described in column "FIG. 4" of Table 1. When the resistance $R_1$ which is the resultant of the resistances CdS $R_1$ to be used for high intensity range of illumination and the resistors $R_3$ and $R_4$, and which has a value $$\frac{(R_1+R_3)R_4}{R_1+R_3+R_4}$$

is computed, resultant resistance $R'_1$ will have values of 6, 7, 9, 12.6, 16.7, 18.5, 19.5 ... 20 KΩ for exposure values $N=16$, 14, 12, 10, 8, 6, 4 ... −2. That is, in the high intensity range of illumination having exposure value $N=16-7$ ($B \cong 26{,}000-50$ lux), the resistance $R'_1$ increases with decrease of the exposure value N. However, the rate of the said increase in $R'_1$ has only a slight effect on the total resistance of the circuit within the range of exposure value $N=7$ and below. On the other hand CdS $R_2$ for the low intensity range of illumination has little influence upon the total resistance $(R'_1+R_2+R_5)$ in the circuit of FIG. 4, because the resistance of CdS $R_2$ is very low within the high intensity range of illumination of $N=16-7$, but begins to increase drastically within the low intensity range of illumination of $N=7$ and below with the result that the said total resistance $(R'_1+R_2+R_5)$ is governed almost entirely by the resistance of CdS $R_2$. That is, the total resistance $(R'_1+R_2+R_5)$ will have values of 21.7, 25.5, 32.1, 48.8, 96 KΩ for exposure values $N=8$, 6, 4, 2, 0 (or $B=100$, 25, 6.3, 1.6, 0.4 lux). When the value of the electric current I corresponding to each of the exposure values N ranging from −2 to 16 ($B \cong 0.1-26{,}000$ lux) is calculated on the basis of the total resistance $(R'_1+R_2+R_5)$ both in the low intensity range of illumination and in the high intensity range of illumination, the characteristic line $f$ as indicated in FIG. 5 is obtained. The characteristic line $f$ is much closer to the ideal line $g$ than the characteristic curves $a$, $b$, $c$, $d$, and $e$ of the conventional apparatuses for measuring exposure values, and therefore the exposure meter of the present invention having the circuit of FIG. 4 can have the exposure values at almost equal scale intervals over a wider range of values than in previous devices. Accordingly, it is possible to make the exposure meter of this invention with the exposure values at equal intervals by selecting resistance values and so forth of the components in the circuit of FIG. 4.

Although the present invention has been described in convention with particular embodiment thereof, it is to be understood that various modifications and improvements can be made therein without departing from the spirit and scope of the invention, as those skilled in the art will readily understand, and such modifications are to be considered as being within the purview and scope of the present invention in the appended claim.

What is claimed is:

A photo-conductive exposure meter which comprises a first photo-conductor for use mainly for a high intensity range of illumination, a plruality of resistors coupled to each other in series and connected in parallel with said first photo-conductor, a second photo-conductor for use mainly for a low intensity range of illumination, one side of which is directly connected to one side of the said first photo-conductor, and a power source, an ammeter and a compensation resistor connected in series and coupled in a branch circuit between the other side of the said second photo-conductor and a coupling between two of the said plurality of resistors, the said compensation resistor being for maintaining the resistance of the branch circuit at a constant value.

References Cited by the Examiner

UNITED STATES PATENTS 2,037,925  4/1936  Rentschler _____ 88—23 X
2,064,517  12/1936  Brice _____ 88—23
2,455,116  11/1948  Gittus _____ 95—10 X

FOREIGN PATENTS 530,456  12/1940  Great Britain.

JEWELL H. PEDERSEN, *Primary Examiner.*